United States Patent [19]

Laughner et al.

[11] Patent Number: 4,837,258

[45] Date of Patent: Jun. 6, 1989

[54] FIRE RETARDANT IMPACT MODIFIED CARBONATE POLYMER COMPOSITION

[75] Inventors: Michael K. Laughner, Lake Jackson; Samuel A. Ogoe, Angleton, both of Tex.

[73] Assignee: The Dow Chemical Company, Midland, Mich.

[21] Appl. No.: 228,203

[22] Filed: Aug. 4, 1988

Related U.S. Application Data

[62] Division of Ser. No. 46,364, May 6, 1987, Pat. No. 4,786,686.

[51] Int. Cl.[4] .................... C08K 5/53; C08K 5/42; C08K 5/44
[52] U.S. Cl. .................... 524/168; 524/169; 524/281
[58] Field of Search ............ 524/168, 169, 281

[56] References Cited

U.S. PATENT DOCUMENTS

| 3,005,795 | 10/1961 | Busse et al. | 525/146 |
| 3,162,695 | 12/1964 | Grabowski | 260/873 |
| 3,852,394 | 12/1974 | Kubota et al. | 525/67 |
| 4,223,100 | 9/1980 | Reinert | 525/146 |
| 4,299,928 | 11/1981 | Witinan | 525/67 |
| 4,463,130 | 7/1984 | Serini et al. | 525/67 |
| 4,564,654 | 1/1986 | Serini et al. | 525/147 |
| 4,617,345 | 10/1986 | Sederel | 525/67 |
| 4,622,363 | 11/1986 | Eichenauer et al. | 525/67 |
| 4,626,563 | 12/1986 | Ogoe et al. | 524/168 |
| 4,649,168 | 3/1987 | Kress et al. | 525/67 |

*Primary Examiner*—Veronica P. Hoke
*Attorney, Agent, or Firm*—Douglas N. Deline

[57] ABSTRACT

A flame retardant, impact resistant carbonate polymer composition comprising a mixture of one or more carbonate polymers, an impact modifying quantity of a rubbery polymer containing residual ethylenic unsaturation, a fluorine containing polymer of the fibril forming type flame retarding quantities of an aromatic sulfur containing compound and a chlorine or bromine substituted organic compound, and, optionally a melt stability enhancing quantity of an organoposphorus compound.

10 Claims, No Drawings

FIRE RETARDANT IMPACT MODIFIED CARBONATE POLYMER COMPOSITION

CROSS-REFERENCE TO RELATED APPLICATIONS

This is a divisional of application Ser. No. 07/046,364, filed May 6, 1987, now U.S. Pat. No. 4,786,686 issued Nov. 22, 1988.

BACKGROUND OF THE INVENTION

This invention relates to impact modified carbonate polymer compositions containing additives which act to reduce the susceptibility of such polymer to burning or at least to minimize the effects of dripping of molten polymer when exposed to fire conditions.

Carbonate polymers derived from reactions of dihydroxyorganic compounds, particularly the dihydric phenols, and carbonic acid derivatives such as phosgene, have found extensive commercial applications because of their excellent physical properties. These thermoplastic polymers are suitable for the manufacture of molded parts wherein impact strength, rigidity, toughness, heat resistance, and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. This is particularly true in the case of impact modified polycarbonates wherein the presence of as little as one percent of a rubbery polymer to improve the impact properties of the blend can lead to substantially increased burn times and dripping of flaming material. As a result, the modified carbonate polymers frequently exhibit substantially poorer resistance to combustion than do the unmodified carbonate polymers.

In attempts to increase the combustion resistance of carbonate polymers, including the impact modified forms thereof, it has been a common practice to incorporate monomeric phosphites, phospheric acid esters, thiophosphoric acid esters containing halogenated alkyl radicals and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

In U.S. Pat. No. 4,463,130 there were disclosed certain blends of a polycarbonate resin, a styrene polymer and a branched polyphosphate. In addition the composition may include polytetrafluoroethylene. Included within the term "styrene polymer" were styrene graft polymers of rubbery substrates including diene, acrylate, or EPDM (ethylene, propylene, diene monomer) rubbers. Examples 2-5 disclosed blends containing polybutadiene modified polystyrene (HIPS), polycarbonate, polytetrafluoroethylene and additional components.

In U.S. Pat. No. 4,617,345 a polymer mixture comprising an aromatic polycarbonate, a partially hydrogenated block copolymer and a rubbery graft copolymer is disclosed. Fire retarding additives could also be present.

In U.S. Pat. No. 4,299,928 acrylate rubbers were employed in polycarbonate compositions also including fire retarding additives.

In U.S. Pat. No. 4,626,928 fire retardant polycarbonates comprising metal salts of sulfimides, chlorinated or brominated bisphenol polycarbonates and polytetrafluoroethylene were disclosed.

SUMMARY OF THE INVENTION

The present invention is an impact resistant carbonate polymer composition comprising a mixture of (a) one or more carbonate polymers, (b) an impact modifying quantity of a rubbery polymer containing residual ethylenic unsaturation, and (c) and a fluorine containing polymer of the fibril forming type. Hereinafter, such compositions will be referred to as fire retardant carbonate polymer compositions, and they exhibit surprisingly high resistance to combustion as well as exhibiting physical properties comparable to an impact modified carbonate polymer containing no fire retardant additive.

In preferred embodiments, the invention additionally comprises one or more components such as metal salts of aromatic sulfur containing compounds, monomeric, oligomeric, or polymeric chloro- or bromo-organic compounds, organophosphorous compounds capable of providing improved polymer heat stability, and processing stability enhancers such as the metal salts or inorganic acids, especially sodium bisulfate.

In a most preferred embodiment, the compositions are substantially free of ungrafted styrene polymer or styrene containing copolymers. The presence of such polymers or copolymers in the matrix leads to inferior fire retardant properties and accordingly is undesired. In a high preferred embodiment the compositions of the invention consist essentially of one or more carbonate polymers, rubbery polymers containing residual ethylenic unsaturation, a fluorine containing polymer of the fibril forming type, and optional fire retarding and stabilizing additives.

The fire retardant impact modified carbonate polymer compositions of the present invention are suitably employed in most applications in which opaque impact modified polycarbonates have been previously utilized. Applications of particular interest for the utilization of the said carbonate polymer compositions of this invention are pigmented and/or colored carbonate polymers useful as: automobile parts, e.g., air filters, fan housings, exterior components, housings for electrical motors, appliances, business and office equipment, photographic equipment, and aircraft applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)-alkylidenes (often called bisphenol-A type diols), including their aromatically and aliphatically substituted derivatives such as disclosed in U.S. Pat. Nos. 2,999,835; 3,038,365, 3,334,154, and 4,299,928; and carbonate polymers derived from other aromatic diols such as described in U.S. Pat. No. 3,169,121.

It is understood, of course, that the carbonate polymer may be derived from (1) two or more different dihydric phenols or (2) one or more dihydric phenols and one or more hydroxy- or acid-terminated reactants such as dicarboxylic acids, or alkylene glycols in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known; for example, several suitable methods are disclosed in the aforementioned patents which are hereby incorporated by reference in their entirety.

The rubbery polymers containing residual ethylenic unsaturation have been found uniquely suited to providing impact resistance in an ignition resistant carbonate polymer composition without adversely affecting the burning characteristics of such polymer. In contrast, highly saturated rubbery polymers including those previously suggested for use in the impact modification of non ignition resistant carbonate polymers such as acrylate rubbers, hydrogenated polydiolefin based rubbers, etc. do not provide the advantageous resistance to the effects of burning achieved by the present invention. This result is believed to be due to the ability of specified rubber to crosslink under the affect of burning conditions and in the presence of the remaining components of the resin blend. Because of this crosslinking phenomenon, the impact modified carbonate polymer blend forms increased amounts of char and dripping of molten polymer is substantially reduced or eliminated.

Suitable rubbery polymers are those polymers having a Tg less than about 20° C., and sufficient residual unsaturation to result in improved performance under burning conditions compared to similar carbonate polymer formulations utilizing saturated rubbers as measured for example by the UL-94 test. Preferably the unsaturated rubbers employed in the invented compositions contain, on average, at least one ethylenically unsaturated group per 25 carbons of the rubbery polymer, most preferably at least one ethylenically unsaturated group per 10 carbons of the rubbery polymer. Preferred rubbery polymers are homopolymers of conjugated dienes, especially butadiene, and interpolymers thereof with one or more copolymerizable comonomers. Preferred comonomers include monovinylidene aromatic monomers, ethylenically unsaturated nitriles and ethylenically unsaturated carboxylic acids or esters thereof. Most preferred comonomers include styrene, acrylonitrile, methyl methacrylate and combinations thereof.

The copolymer rubbers may be in the form of a block copolymer or a random interpolymer. The rubber additionally is made compatible with the carbonate polymer matrix by any suitable technique. Preferably, one or more graft polymers are employed to facilitate polymer compatibility. Such grafting operation is performed in a known manner. Preferred are graft polymers of the shell/core type comprising a graft of styrene/methyl methacrylate copolymer on a butadiene homopolymer or copolymer core. Such compositions have been previously disclosed in U.S. Pat. No. 4,617,345, the teachings of which are herein incorporated in their entirety by reference thereto. Examples of the latter class of graft polymers include those compositions available commercially under the trade name Paraloid ® 3607 available from Rohm and Haas Company.

The rubbery polymers preferably are not acrylate, EP or EPDM or other highly saturated rubbers such as the hydrogenated rubbers disclosed in U.S. Pat. Nos. 4,430,475; 4,444,949; 4,448,930; 4,461,868; 4,579,903; 4,617,345 and elsewhere. The teachings of these patents are hereby incorporated by reference.

Also as previously mentioned, the composition of the invention preferably does not contain substantial quantities of a styrenic matrix resin which would result in loss of fire retardant properties.

Suitable fluorine containing polymers are those adapted to form a fibril structure to stabilize the polymer under molten conditions. Such polymers are known to include polytetrafluoroethylene, as disclosed by U.S. Pat. Nos. 3,005,795, 3,671,487 and 4,463,130; but additional suitable polymers may be substituted. Examples of other fluorine containing polymers include partially fluorinated polymers, fluoro-, bromo-substituted polymers, and polycarbonates made from fluorinated diphenols, such as those disclosed in U.S. Pat. No. 4,379,910. The teachings of all of the above mentioned patents are incorporated herein by reference.

Additional components may be employed in the present composition to achieve even better fire retardant and other polymer properties. Such additional components include metal salts of sulfur compounds, and chlorine or bromine containing compounds.

Metal salts of sulfur compounds include metal salts of aromatic sulfonates, sulfates, sulfonamides, sulfimides, etc. A preferred aromatic sulfur compound is an aromatic sulfimide represented by the formula:

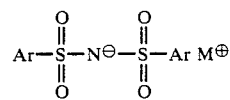

wherein Ar is an aromatic or substituted aromatic group and M is a metal cation. Suitable metals include Groups I and IIA metals as well as copper, aluminum, antimony, and the like. M is preferably an alkali metal, most preferably sodium or potassium. Representative preferred sulfimide salts include the alkali metal salts of saccharin, N-(p-tolylsulfonyl)-p-toluene-sulfimide, N-(N'-benzylaminocarbonyl)sulfanilimide, N-(phenylcarboxyl)-sulfanilimide, N-(2-pyrimidinyl)-sulfanilimide, N-(2-thiazolyl)sulfanilimide and other salts of the sulfimides disclosed in U.S. Pat. No. 4,254,015, which is incorporated herein by reference. Combinations of the above-identified salts can also be employed.

Useful monomeric chloro- or bromo-halogenated organic compounds are halogenated diphenyl sulfone, diphenyl, diphenyl oxide, benzene, phthalimide, and mixtures thereof. These compounds can be mono or poly halogenated preferably with bromine atoms since they cause less degradation of the polycarbonate and appear to be more efficient as flame retardants.

Useful oligomeric or polymeric chloro- or bromo-halogenated organic compounds are oligomeric and polymeric carbonate derivatives of a chlorinated or brominated bisphenol with or without an additional nonhalogenated bisphenol. Thus, homopolymers and copolymers are useful in this invention. In addition, the oligomeric or polymeric chloro- or bromo-halogenated compound may be a halogenated polymer other than a polycarbonate. Examples include polymers of halogenated vinyl aromatic monomers such as chlorinated or brominated styrene containing polymers, taught for example in U.S. Pat. No. 3,896,185, the teachings of which are incorporated in their entirety by reference herein.

As previously mentioned, the invented composition advantageously employs an organophosphorous compound to aid in preventing polymer degradation under molding conditions. Suitable organo phosphorous compounds are the phosphorous esters such as those disclosed in U.S. Pat. No. 4,514,357, and references cited during the prosecution thereof, the teachings of which are incorporated herein by reference.

Useful melt stabilizing additives are metal bisulfates or sulfates having a pka from 1 to 5 and preferably 1 to 3. Examples of the latter include sodium bisulfate, potassium bisulfate, lithium bisulfate, rubidium bisulfate, cesium bisulfate, and aluminum sulfate.

The carbonate polymer compositions of the present invention are suitably prepared by combining the ingredients in effective amounts using any of a variety of blending procedures conventionally employed for polymer blends. For example, dry particulates of the carbonate polymer, rubbery polymer, and the other additives can be dry blended and the resulting dry blend extruded into the desired shape. By "effective amount" is meant the relative amount of the respective components that is sufficient to provide the desired polymer characteristic.

The rubbery polymer is employed in an amount to result in improved impact strengths of the resulting blend. Suitable amounts are from about 0.1 to about 20 weight (wt.), percent, preferably about 0.5 to about 10 wt. percent based on total composition weight.

The metal salt of an aromatic sulfur compound, monomeric oligomer, or polymer chloro- or bromo-organic compound, and fluorine containing polymer are employed in respective amounts to provide the desired degree of resistance to the effects of burning. For example, a composition may be formulated to provide the desired "V" rating when tested under the conditions of the UL-94 test. Thus the metal salt of an aromatic sulfur containing compound is employed in an amount that imparts to the composition a desired level of fire retardancy. Preferred amounts are in the range from about 0.001 to about 2 percent, especially from about 0.001 to about 1.0 weight percent based on total composition weight.

Similarly, the amount of the chloro- or bromo-halogenated organic compound is selected to provide a final halogen content of composition in the range from about 0.01 to 10 percent by weight and most preferably from about 0.1 to about 1.0 percent by weight. It is to be understood that one can use relatively small amounts of a highly halogenated aromatic compound or a relatively large amount of a sparsely halogenated compound to achieve the above desired ranges.

The amount of the fibril forming fluorine containing polymer is preferably in the range from about 0.01 to about 10 percent and preferably in the range from about 0.1 to about 5 percent by weight based on total composition weight.

Where employed, the additional components, organophosphorous compounds and metal salts of inorganic acids are suitably present in sufficient amounts to impart assistance to degradation in the melt, i.e., lack of color formation or molecular weight degradation under molding conditions, and melt stability. Preferred amounts are preferably from about 0.005 to about 1% by weight of organophosphorous compound, and 0.001 to about 1% by weight of metal salt of an inorganic acid.

In addition, other additives can be included in the impact modified carbonate polymer composition of the present invention such as fillers (i.e., glass fibers), pigments, dyes, antioxidants, heat stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

Carbonate polymer formulations containing a bisphenol A polycarbonate (Calibre® 300, available from The Dow Chemical Company, having a molecular weight of 22,000 (BPA/PC); polytetrafluoroethylene (PTFE) various rubbers, and optional components; tetrabromobisphenol A polycarbonate oligomer (BC-52) available from Great Lakes Chemicals, Inc. (TBBPA/PC); potassium paratolylsulfimide (KpTSM); ; potassium bisulfate (KHSO4); were prepared containing respective amounts of the ingredients as indicated in Table I. Also prepared were control compositions of only BPA/PC and a composition lacking rubber. The unsaturated rubber tested was a methyl methacrylate/styrene copolymer grafted polybutadiene (Paraloid® 3607) available from Rohm and Haas. Comparative examples included a methacrylate/- styrene grafted butyl acrylate (Paraloid® 3330), a styrene/acrylonitrile grafted EPDM (VISTALON® 3708) available from Exxon Corporation, and a hydrogenated styrene/-butadiene block copolymer (KRATON G-1651) available from Shell.

Results of testing various properties including resistance to burning according to UL-94 are contained in Table I.

TABLE I

| Run | Composition (pt. by wt.) | Izod Impact* | % Brittle** | UL-94 | Burn Time (sec.) | # Drips |
|---|---|---|---|---|---|---|
| 1*** | 100 BPA/PC | 16.2 | 0 | V-2 | 20.0 | 5.5 |
| 2*** | 98.5 BPA/PC<br>0.1 KpTSM<br>0.1 KHSO$_4$<br>1.0 TBBA/PC<br>0.3 PTFE | 2.5 | 100 | V-0 | 1.0 | 0/5 |
| 3*** | 98.2 BPA/PC<br>0.057 KpTSM<br>0.05 KHSO4<br>0.5 TBBA<br>0.2 PTFE<br>1.0 PARALOID 3330 | 7.2 | 38 | V-2 | 9.0 | 1/5 |
| 4*** | 98.2 BPA/PC<br>0.05 KPTSM<br>0.05 KHSO4<br>0.5 TBBA<br>0.2 PTFE<br>1.0 VISTALON 3708 | 12.4 | 13 | V-2 | 7.0 | 5/5 |
| 5*** | 98.2 BPA/PC<br>0.05 KPTSM<br>0.05 KHSO4<br>0.5 TBBA<br>0.2 PTFE<br>1.0 KRATON | 10.0 | 25 | V-2 | 20.1 | 5/5 |

TABLE I-continued

| Run | Composition (pt. by wt.) | Izod Impact* | % Brittle** | UL-94 | Burn Time (sec.) | # Drips |
|---|---|---|---|---|---|---|
| 6 | 98.2 BPA/PC<br>0.05 KPTSM<br>0.05 KHSO4<br>0.5 TBBA<br>0.2 PTFE<br>1.0 PARALOID 3607<br>G-1651 | 15.2 | 0 | V-0 | 1.2 | 0/5 |
| 7 | 96.5 BPA/PC<br>0.1 KPTSM<br>0.1 KHSO4<br>1.0 TBBA<br>0.3 PTFE<br>2.0 PARALOID 3607 | 14.8 | 0 | V-0 | 1.0 | 0/5 |
| 8 | 96.5 BPA/PC<br>0.1 KPTSM<br>0.1 KHSO4<br>1.0 TBBA<br>0.3 PTFE<br>2.0 PARALOID 3607 | 15.0 | 0 | V-0 | 1.1 | 0/5 |
| 9 | 94.5 BPA/PC<br>0.1 KPTSM<br>0.1 KHSO4<br>1.0 TBBA<br>0.3 PTFE<br>3.0 PARALOID 3607 | 15.2 | 0 | V-0 | 1.4 | 0/5 |
| 10 | 98.6 BPA/PC<br>0.1 KHSO4<br>0.3 PTFE<br>1.0 PARALOID 3607 | 14.9 | 0 | V-0 | 0.9 | 0/5 |
| 11 | 96.6 BPA/PC<br>0.1 KHSO4<br>0.3 PTFE<br>3.0 PARALOID 3607 | 15.0 | 0 | V-0 | 1.3 | 0/5 |
| 12 | 98.7 BPA/PC<br>0.3 PTFE<br>1.0 PARALOID 3607 | 15.2 | 0 | V-0 | 1.5 | 0/5 |
| 13 | 96.7 BPA/PC<br>0.3 PTFE<br>3.0 PARALOID 3607 | 15.5 | 0 | V-0 | 1.8 | 0/5 |

*10-ml Izod impact strength 40° F. (ft. lbs/in. notch).
**Percentages of samples showing brittle failure (ASTM D-256).
***Not examples of the invention.

As may be seen by reference to Table I, good impact properties and fire resistant properties are provided in the present invention.

We claim:

1. A flame retardant, impact resistant aromatic carbonate polymer composition comprising a mixture of: (a) one or more aromatic carbonate polymers, (b) an impact modifying quantity of a rubbery polymer selected from the group consisting of styrene/methyl methacrylate copolymer grafted onto homopolymers or interpolymers of butadiene, (c) from 0.01 to 10.0 percent by weight of the total composition of a fluorine containing polymer of the fibril forming type, (d) a metal salt of an aromatic sulfur containing compound; and (e) a monomeric, oligomeric or polymeric chlorine or bromine substituted organic compound, wherein (d) and (e) are present in an amount sufficient to enhance the flame retardant properties of the aromatic carbonate polymer.

2. The flame retardant, impact resistant aromatic carbonate polymer composition of claim 1, wherein the aromatic carbonate polymer is a polycarbonate of a bis-(arylhydroxyphenyl)-alkylidene or other aromatic diol.

3. The flame retardant, impact resistant aromatic carbonate polymer composition of claim 2, wherein the aromatic carbonate polymer is a polycarbonate of Bisphenol A.

4. The flame retardant, impact resistant aromatic carbonate polymer composition of claim 1, wherein the aromatic sulfur containing compound is an aromatic sulfonate, aromatic sulfate, aromatic sulfonamide or aromatic sulfimide.

5. The flame retardant, impact resistant aromatic carbonate polymer composition of claim 1, wherein the metal salt of an aromatic sulfur compound is represented by the formula:

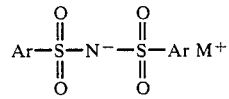

wherein Ar is an aromatic or substituted aromatic monovalent radical, and M+ is a metal cation.

6. The flame retardant, impact resistant aromatic carbonate polymer composition of claim 5, wherein the metal cation is a cation of an alkali metal.

7. The flame retardant, impact resistant aromatic carbonate polymer composition of claim 6, wherein the aromatic sulfur containing compound is potassium paratolylsulfimide.

8. The flame retardant, impact resistant aromatic carbonate polymer composition of claim 1, wherein the fluorine containing polymer is polytetrafluoroethylene.

9. The flame retardant, impact resistant aromatic carbonate polymer composition of claim 1, wherein the chlorine or bromine substituted aromatic compound is a derivative of a chlorinated or brominated bisphenol.

10. The flame retardant, impact resistant aromatic carbonate polymer composition of claim 1, further comprising an organo phosphorus compound in an amount sufficient to enhance the aromatic carbonate polymer's melt stability.

* * * * *